(12) United States Patent
Shin et al.

(10) Patent No.: US 11,099,455 B2
(45) Date of Patent: Aug. 24, 2021

(54) OPTICAL BEAM STEERING DEVICES AND SENSOR SYSTEMS INCLUDING THE SAME

(71) Applicant: Samsung Electronics Co., Ltd., Suwon-si (KR)

(72) Inventors: Dong Jae Shin, Seoul (KR); Seong Gu Kim, Pyeongtaek-si (KR); Yong Hwack Shin, Hwaseong-si (KR); Chang Gyun Shin, Anyang-si (KR); Dong Sik Shim, Hwaseong-si (KR); Chang Bum Lee, Seoul (KR); Jung Ho Cha, Yongin-si (KR); Kyoung Ho Ha, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 512 days.

(21) Appl. No.: 16/042,135

(22) Filed: Jul. 23, 2018

(65) Prior Publication Data
US 2019/0227403 A1     Jul. 25, 2019

(30) Foreign Application Priority Data
Jan. 24, 2018 (KR) .......................... 10-2018-0008838

(51) Int. Cl.
*G02F 1/00*     (2006.01)
*G01S 7/48*     (2006.01)
(Continued)

(52) U.S. Cl.
CPC ............ *G02F 1/292* (2013.01); *G01S 7/4804* (2013.01); *G01S 7/4812* (2013.01); *G01S 7/4817* (2013.01); *G02B 26/08* (2013.01); *G02F 2203/24* (2013.01)

(58) Field of Classification Search
USPC ........................................................ 356/4.01
See application file for complete search history.

(56) References Cited

U.S. PATENT DOCUMENTS

| | | | |
|---|---|---|---|
| 5,784,098 A | | 7/1998 | Shoji et al. |
| 5,793,907 A | * | 8/1998 | Jalali .................... G02B 6/2861 385/24 |

(Continued)

FOREIGN PATENT DOCUMENTS

| | | |
|---|---|---|
| KR | 10-2009-0107661 A | 10/2009 |
| KR | 10-1754022 B1 | 7/2017 |

(Continued)

*Primary Examiner* — James R Hulka
(74) *Attorney, Agent, or Firm* — Harness, Dickey & Pierce, P.L.C.

(57) ABSTRACT

An optical beam steering device may include a tunable laser diode configured to emit laser beams and an antenna that includes a grating structure and is configured to convert the laser beams to a linear light source based on the grating structure. The tunable laser diode may emit a first laser beam having a first wavelength, and emit a second laser beam having a second wavelength, the second wavelength different from the first wavelength. The antenna may receive the first laser beam and, in response, output a first linear light source having a first emission angle with a surface of the antenna. The antenna may further receive the second laser beam and, in response, output a second linear light source having a second emission angle with the surface of the antenna, the second emission angle different from the first angle.

20 Claims, 13 Drawing Sheets

(51) Int. Cl.
*G02F 1/29* (2006.01)
*G01S 7/481* (2006.01)
*G02B 26/08* (2006.01)

(56) References Cited

U.S. PATENT DOCUMENTS

| | | | | |
|---|---|---|---|---|
| 5,982,334 | A * | 11/1999 | Manasson | H01Q 13/28 |
| | | | | 343/700 MS |
| 6,563,966 | B1 * | 5/2003 | Tang | G02B 6/122 |
| | | | | 385/10 |
| 7,854,505 | B2 * | 12/2010 | Cunningham | G02B 1/005 |
| | | | | 351/44 |
| 8,988,754 | B2 * | 3/2015 | Sun | G02B 6/26 |
| | | | | 359/238 |
| 9,007,600 | B2 | 4/2015 | Imaki et al. | |
| 9,091,535 | B2 | 7/2015 | Baeg et al. | |
| 9,476,981 | B2 | 10/2016 | Yaacobi et al. | |
| 9,477,135 | B1 | 10/2016 | Uyeno et al. | |
| 9,740,079 | B1 | 8/2017 | Davids et al. | |
| 9,753,351 | B2 | 9/2017 | Eldada | |
| 10,061,019 | B1 * | 8/2018 | Campbell | G01S 7/4865 |
| 10,627,517 | B2 * | 4/2020 | Yaacobi | G02F 1/292 |
| 2002/0163717 | A1 | 11/2002 | Lee | |
| 2009/0323014 | A1 * | 12/2009 | Cunningham | G02C 7/107 |
| | | | | 351/44 |
| 2014/0192394 | A1 * | 7/2014 | Sun | G02B 6/12033 |
| | | | | 359/289 |
| 2014/0307264 | A1 * | 10/2014 | Luthi | G01B 5/004 |
| | | | | 356/498 |
| 2015/0346340 | A1 * | 12/2015 | Yaacobi | G01S 7/4915 |
| | | | | 356/5.11 |
| 2015/0378241 | A1 * | 12/2015 | Eldada | G01S 7/4817 |
| | | | | 359/15 |
| 2016/0161662 | A1 | 6/2016 | Jung et al. | |
| 2017/0016990 | A1 * | 1/2017 | Yaacobi | G01S 17/36 |
| 2017/0062924 | A1 | 3/2017 | Lee et al. | |
| 2017/0153319 | A1 * | 6/2017 | Villeneuve | H01S 3/08086 |
| 2017/0329002 | A1 | 11/2017 | Koerber et al. | |
| 2018/0024241 | A1 * | 1/2018 | Eichenholz | H01S 5/4012 |
| | | | | 356/5.01 |
| 2018/0069367 | A1 * | 3/2018 | Villeneuve | G01S 7/4816 |
| 2018/0231659 | A1 * | 8/2018 | Campbell | G01S 17/26 |
| 2018/0284228 | A1 * | 10/2018 | LaChapelle | G01S 7/4817 |
| 2018/0284284 | A1 * | 10/2018 | Curatu | G02B 26/101 |
| 2018/0284285 | A1 * | 10/2018 | Curatu | G01S 17/42 |
| 2018/0364356 | A1 * | 12/2018 | Eichenholz | H01S 5/4087 |

FOREIGN PATENT DOCUMENTS

| | | |
|---|---|---|
| KR | 10-2017-0090427 A | 8/2017 |
| WO | WO-2016/087679 A1 | 6/2016 |

* cited by examiner

OPTICAL BEAM STEERING DEVICES AND SENSOR SYSTEMS INCLUDING THE SAME

CROSS-REFERENCE TO RELATED APPLICATIONS

This application claims the benefit under 35 U.S.C. § 119 of Korean Patent Application No. 10-2018-0008838, filed on Jan. 24, 2018 in the Korean Intellectual Property Office, the disclosure of which is incorporated herein in its entirety by reference.

BACKGROUND

1. Field of the Disclosure

The present disclosure relates to optical beam steering devices and sensor systems including the same.

2. Description of the Related Art

A LIDAR (light detection and ranging) system is a system that can obtain information associated with a target in an external environment, including a distance from the LIDAR system to the target, by emitting a pulsed laser beam toward the target and by sensing the energy reflected from the target (e.g., by detecting a reflection of the pulsed laser beam from a surface of the target). In some cases, an obstacle detection sensor or the like of an autonomous vehicle may include a LIDAR system.

A LIDAR system may include an optical beam steering device which may steer a pulsed laser beam emitted by the LIDAR system with respect to the target at a desired angle. As a result of recent tendencies toward miniaturization of integrated circuits, it is desirable to simplify the configuration of the optical beam steering device and downsize the LIDAR system.

SUMMARY

Some example embodiments of the present disclosure provide optical beam steering devices having a simple configuration.

Some example embodiments of the present disclosure provide sensor systems including optical beam steering devices having a simple configuration.

The example embodiments of the present disclosure are not limited to those mentioned above and some example embodiments which have not been mentioned can be clearly understood by those skilled in the art from the description below.

According to some example embodiments of the present disclosure, an optical beam steering device may include a tunable laser diode configured to emit laser beams and an antenna including a grating structure and configured to convert the laser beams emitted by the tunable laser diode to a linear light source based on the grating structure. The tunable laser diode, to emit the laser beams, may emit a first laser beam having a first wavelength and may further emit a second laser beam having a second wavelength, the second wavelength different from the first wavelength. The antenna, to convert the laser beams emitted by the tunable laser diode to a linear light source based on the grating structure, may receive the first laser beam and, in response, output a first linear light source having a first emission angle with a surface of the antenna and may further receive the second laser beam and, in response, output a second linear light source having a second emission angle with the surface of the antenna, the second emission angle different from the first emission angle.

According to some example embodiments of the present disclosure, an optical beam steering device may include a tunable laser diode configured to emit laser beams, first and second optical amplifiers, first and second bandpass filters, a first antenna extending in a first direction, and a second antenna extending in a second direction. The second direction may be substantially orthogonal to the first direction. The tunable laser diode, to emit the laser beams, may emit a first laser beam having a first wavelength and may further emitting a second laser beam having a second wavelength, the second wavelength different from the first wavelength. The first and second optical amplifiers may be configured to amplify the first and second laser beams emitted by the tunable laser diode, respectively. The first and second bandpass filters may be configured to filter the first and second laser beams amplified by the first and second optical amplifiers, respectively. The first antenna may be configured to convert the filtered first laser beam to a linear light source extending in the second direction, such that the linear light source extending in the second direction has a first emission angle with a surface of the first antenna. The second antenna may be configured to convert the filtered second laser beam to a linear light source extending in the first direction, such that the linear light source extending in the first direction has a second emission angle with a surface of the second antenna, the second emission angle different from the first emission angle.

According to some example embodiments of the present disclosure, an optical beam steering device may include a tunable laser diode configured to emit a laser beam, a first antenna including a plurality of first gratings spaced apart from each other by a first distance, and a second antenna including a plurality of second gratings spaced apart from each other by a second distance different from the first distance. The first antenna may be configured to convert the laser beam to a linear light source having a first emission angle with a surface of the first antenna through the plurality of first gratings. The second antenna may be configured to convert the laser beam to a linear light source having a second emission angle with a surface of the second antenna through the plurality of second gratings.

According to some example embodiments of the present disclosure, a sensor system may include an optical beam steering device configured to irradiate a target with an output light; and an optical receiver configured to receive a light of the output light reflected from the target. The optical beam steering device may include a tunable laser diode configured to emit laser beams. The emitting may include emitting a first laser beam having a first wavelength and emitting a second laser beam having a second wavelength, the second wavelength different from the first wavelength. The optical beam steering device may further include an antenna including a grating structure. The antenna may be configured to convert the laser beams emitted by the tunable laser diode to a linear light source based on the grating structure. The converting may include receiving the first laser beam and, in response, outputting a first linear light source having a first emission angle with a surface of the antenna, and receiving the second laser beam and, in response, outputting a second linear light source having a second emission angle with the surface of the antenna, the second emission angle different from the first emission angle.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF THE EMBODIMENTS

Figure 1:
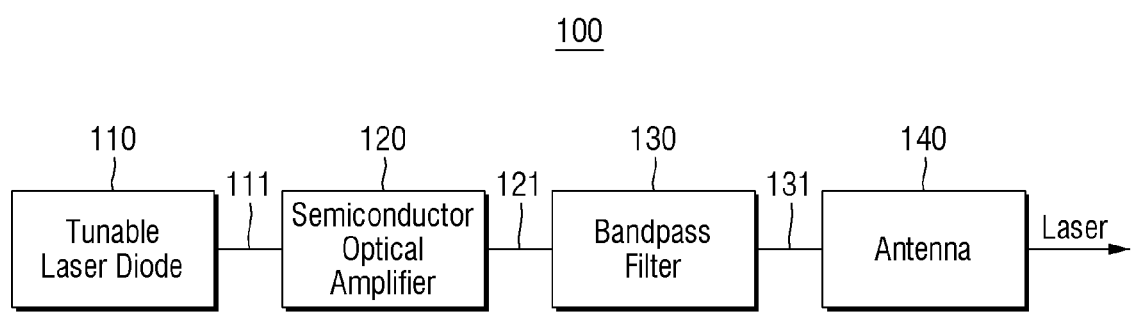
FIG. 1 is a block diagram of an optical beam steering device according to some example embodiments of the present disclosure.

FIG. 1 is a block diagram of an optical beam steering device according to some example embodiments of the present disclosure.

Referring to FIG. 1, an optical beam steering device 100 according to some example embodiments of the present disclosure may include a tunable laser diode 110, an optical amplifier 120, a bandpass filter 130, and an antenna 140.

The tunable laser diode 110 may be configured to emit (e.g., output) a laser beam. The tunable laser diode 110 may mean a laser diode that can change the oscillation frequency via drive current or drive frequency control. The tunable laser diode 110 may vary the wavelength band of laser emitted through a change in oscillation frequency.

For example, the tunable laser diode 110 may emit (e.g., output) a laser beam of a first wavelength (e.g., a first laser beam) under (e.g., in response to) a first condition, and may emit a laser beam of a second wavelength (e.g., second laser beam) under (e.g., in response to) a second condition. The first condition and the second condition may be different from each other, and the first wavelength and the second wavelength may be different from each other. The laser beams of different wavelengths generated by the tunable laser diode 110 will be described later in more detail.

Although not illustrated in FIG. 1, the optical beam steering device 100 may further include a driving driver capable of changing the output wavelength or the oscillation wavelength by applying current or frequency to the tunable laser diode 110.

Laser beam generated from the tunable laser diode 110 may be provided to the optical amplifier 120 through a waveguide 111.

The optical amplifier 120 may amplify the laser beam provided from the tunable laser diode 110 through the waveguide 111. Restated, the optical amplifier 120 may be configured to amplify light (e.g., a laser beam) emitted by the tunable laser diode 110. Specifically, the optical amplifier 120 receives a current from an external power supply and may generate the amplified laser beam, using the energy of the provided current.

The optical signal amplified from the optical amplifier 120 may be provided to the bandpass filter 130 through the waveguide 121.

The bandpass filter 130 receives the laser beam provided from the optical amplifier 120 through the waveguide 121, and may filter the optical signal for the provided laser beam other than band to be used by the optical beam steering device 100. Noise may be removed from the optical signal that has passed through the bandpass filter 130. The filtered optical signal may be provided to the antenna 140 through the waveguide 131. Restated, the bandpass filter 130 may be configured to filter light amplified by the optical amplifier 120 and may be further configured to provide the filtered light to the antenna 140.

The antenna 140 may emit the provided optical signal toward the target. The antenna 140 may emit the laser beam to the target in the form of a linear light source. Restated, the antenna 140 may convert the laser beam emitted by the tunable laser diode 110 into a linear light source that is emitted (e.g., output) by the antenna 140. The antenna 140 may be disposed, for example, in a vertical or horizontal structure. When the antenna 140 is disposed as a vertical antenna, the laser beam emitted from the antenna 140 may have a form of a horizontal linear light source. When the antenna 140 is disposed as a horizontal antenna, the laser beam emitted from the antenna 140 may have a form of a vertical linear light source.

However, the arrangement direction of the antenna 140 and the shape of the laser beam emitted from the antenna 140 are not limited thereto. That is, the antenna 140 is disposed in an arbitrary first direction, and the laser beam emitted from the antenna 140 may have a form of a linear light source extending in a second direction perpendicular to the first direction.

The antenna 140 may include a plurality of gratings therein. Specifically, the antenna 140 may include a plurality of gratings spaced apart from each other at a constant cycle. The plurality of gratings may be referred to herein as a grating structure.

Figure 2:
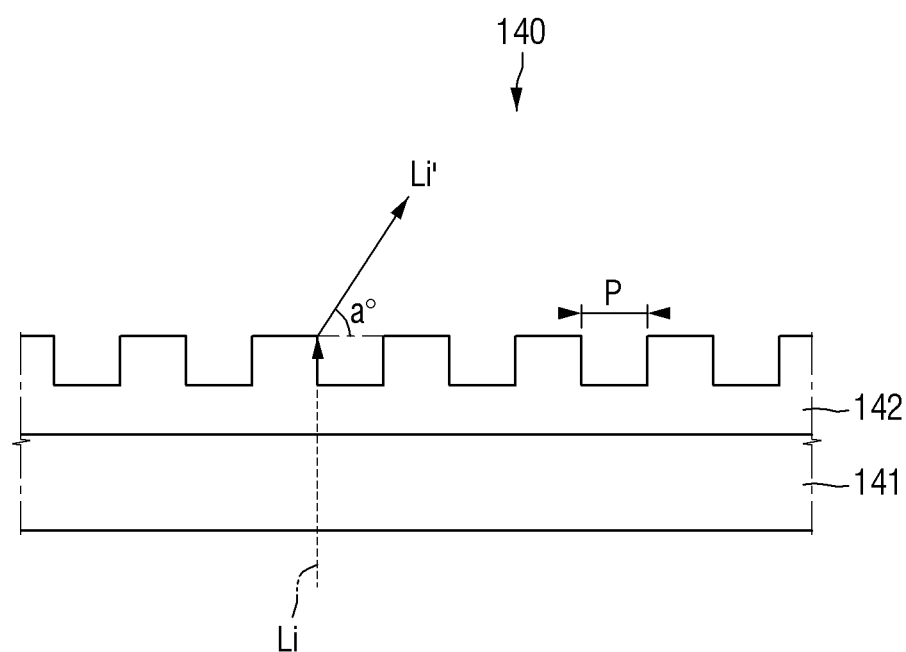
FIG. 2 is a conceptual diagram for explaining an antenna included in the optical beam steering device of FIG. 1.

FIG. 2 is a conceptual diagram for explaining an antenna included in the optical beam steering device of FIG. 1.

Referring to FIG. 2, the antenna 140 may include a substrate 141, and a grating structure (e.g., the plurality of gratings 142) formed on the substrate 141. The substrate 141 may include, for example, a silicon substrate, but the present disclosure is not limited thereto. The substrate 141 may be a silicon-on-insulator (SOI).

The tunable laser diode 110, the optical amplifier 120, the bandpass filter 130 and the antenna 140 included in the optical beam steering device 100 of FIG. 1 may be disposed on the same substrate. That is, in some example embodiments of the present disclosure, the optical beam steering device 100 may include a structure in which the tunable laser diode 110, the optical amplifier 120, the bandpass filter 130 and the antenna 140 are formed on the substrate 141 of the antenna 140, but the present disclosure is not limited thereto.

The antenna 140 may include a plurality of gratings 142 separated from each other at a constant distance P. The plurality of gratings 142 may be referred to herein as a grating structure. As shown in FIG. 2, a laser beam emitted by the tunable laser diode 110 may pass from the substrate 141 towards and through the gratings 142 of the grating structure, for example when the tunable laser diode 110 is included in the substrate 141, when the substrate 141 is between the tunable laser diode 110 and the gratings 142, some combination thereof, or the like. As shown in FIG. 2, a laser beam Li emitted by the tunable laser diode 110 that passes through the gratings 142 is converted to a laser beam Li' (e.g., a light beam that is output by the antenna 140) that has an emission angle a°. For example, as shown in FIG. 2, the laser beam Li may enter the gratings 142 at an angle that is perpendicular or substantially perpendicular (e.g., perpendicularly within manufacturing tolerances and/or material tolerances) in relation to the antenna 140, and the laser beam Li' that is emitted (e.g., output) by the antenna 140 may be a linear light source and may have an emission angle a° (also referred to herein as simply an "angle") that is different from perpendicular or substantially perpendicular to the antenna 140. In the laser beam Li' emitted from the antenna 140, an emission angle a° of the laser beam Li' may be determined by a distance P between the gratings 142, and the wavelength of beam Li generated (e.g., emitted) from the tunable laser diode 110. The grating 142 may include, for example, a dielectric grating, but the present disclosure is not limited thereto.

Hereinafter, the operation of the optical beam steering device 100 using the antenna 140 will be described in more detail with reference to FIG. 3.

Figure 3:
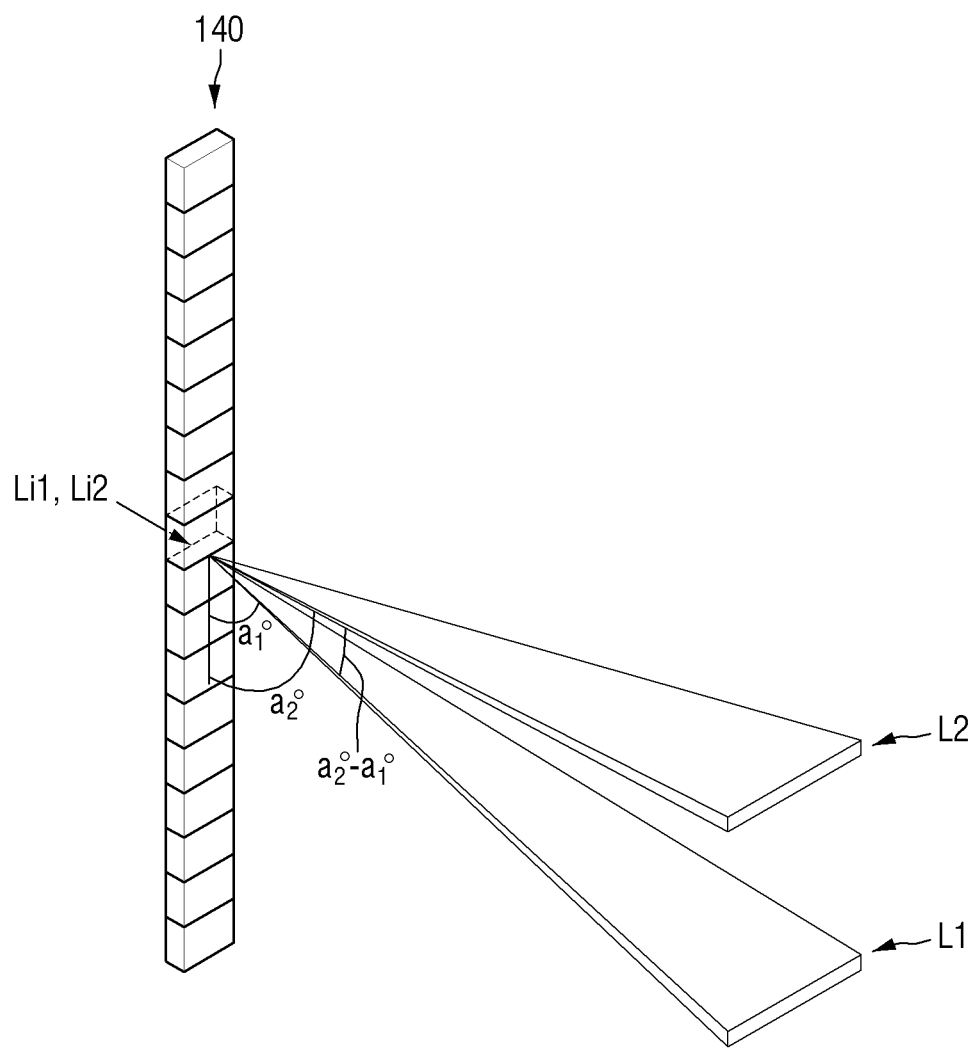
FIG. 3 is a perspective view for explaining the operation of the optical beam steering device of FIG. 1.

FIG. 3 is a perspective view for explaining the operation of the optical beam steering device of FIG. 1.

Referring to FIG. 3, emission of first light L1 and second light L2 from the antenna 140 is illustrated. The antenna 140 shown in FIG. 3 includes a grating structure including a plurality of gratings 142 as described above with reference to FIG. 2. As shown in FIG. 3, a first laser beam Li1 having a first wavelength and a second laser beam Li2 having a second, different wavelength may be received at the antenna 140 from a tunable laser diode. The antenna 140 may convert the first laser beam Li1 into the first light L1 (e.g., first light beam L1) and may convert the second laser beam Li2 into the second light L2 (e.g., second light beam L2) based on the first laser beam and second laser beam Li2 passing through the antenna 140 towards the gratings (e.g., grating structure) of the antenna 140 and being emitted from the antenna 140 through said gratings, respectively. As described above, the first light L1 and the second light L2 emitted from the antenna 140 may take the form of a linear light source. Thus, the antenna 140 is configured to convert a laser beam emitted by the tunable laser diode 110 to a linear light source based on a grating structure of the antenna 140.

For example, when the antenna 140 is disposed as the vertical antenna, both the first light L1 and the second light L2 may be a horizontal linear light source. In some example embodiments, when the antenna 140 is disposed as the horizontal antenna, both the first light L1 and the second light L2 may be a vertical linear light source.

The first light L1 and the second light L2 may have different angles emitted from the antenna 140 (e.g., different emission angles). Here, the "angle emitted from the antenna 140" means an angle formed between a traveling direction of the first light L1 or the second light L2 and the surface of the antenna 140 (e.g., an emission angle). That is, taking FIG. 2 as an example, the emission angle at which the laser beam is emitted from the antenna 140 may be a°.

In FIG. 3, an angle at which the first light L1 is emitted from the antenna 140 may be a1°, and an angle at which the second light L2 is emitted from the antenna 140 may be a2°. Restated, and as shown in FIG. 3, the antenna 140 may receive the first laser beam Li1 at one surface and may, in response, output a first linear light source (e.g., the first light L1) from an opposite surface of the antenna 140, the first linear light source having a first emission angle (e.g., a1°) with the opposite surface of the antenna, and the antenna 140 may receive the second laser beam Li2 at the one surface and may, in response, output a second linear light source (e.g., L2) having a second emission angle (e.g., a2°) with the opposite surface of the antenna 140, where the second emission angle (e.g., a2°) is different from the first emission angle (e.g., a1°). The first light L1 illustrated in FIG. 3 is light that forms a minimum angle a1° with the surface of the antenna 140 among the laser beam that can be emitted from the antenna 140. In addition, the second light L2 is light that makes a maximum angle a2° with the surface of the antenna 140 among the laser beam that can be emitted from the antenna 140.

Thus, the antenna 140 may emit laser beam forming an angle (e.g., emission angle) between a1° and a2° with its surface. In order to control the angle formed between the laser beam emitted from the antenna 140 and the surface of the antenna 140 (e.g., control the emission angle), the wavelength of the laser beam generated (e.g., emitted) from the tunable laser diode 110 may be controlled. This will be explained in more detail with reference to FIG. 4.

Figure 4:
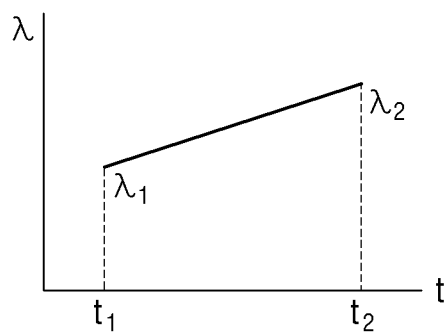
FIG. 4 is a graph for explaining the operation of the optical beam steering device of FIG. 1.
Figure 4:
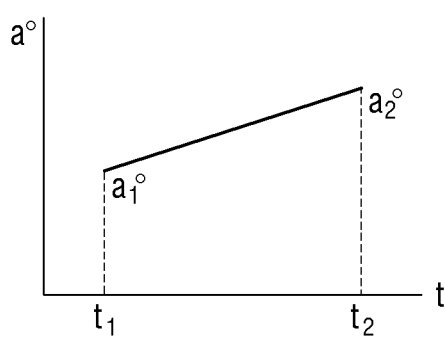

FIG. 4 is a graph for explaining the operation of the optical beam steering device 100 of FIG. 1.

Referring to FIG. 4, a graph in which the tunable laser diode 110 generates light of a first wavelength $\lambda 1$ at a first time t1 and generates light of a second wavelength $\lambda 2$ at a second time t2 is illustrated. As illustrated in FIG. 4, the tunable laser diode 110 generates the laser beam of the first wavelength $\lambda 1$ at the first time t1, and then continuously increases the wavelength of the generated light, thereby generating the laser beam of the second wavelength $\lambda 2$ at the second time t2.

The case where the tunable laser diode 110 generates the laser beam of the first wavelength $\lambda 1$ may be generation of laser beam under the first condition. Specifically, the tunable laser diode 110, for example, is provided with a power supply having current or frequency of a first magnitude from a drive driver (not illustrated) connected thereto, thereby generating the laser beam of the first wavelength $\lambda 1$.

In some example embodiments, the case where the tunable laser diode 110 generates the laser beam of the second wavelength $\lambda 2$ may be generation of laser beam under the second condition. Specifically, the tunable laser diode 110, for example, is provided with a power supply having current or frequency of a second magnitude from a drive driver (not illustrated) connected thereto, thereby generating the laser beam of the second wavelength $\lambda 2$.

According to the graph of FIG. 4, the case where the wavelength of the light generated by the tunable laser diode 110 is linearly increased from the first wavelength $\lambda 1$ of the first time t1 to the second wavelength $\lambda 2$ of the second time t2 is illustrated. However, the present disclosure is not limited thereto. The graph of FIG. 4 is an example, and the tunable laser diode 110 may nonlinearly change the wavelength of the laser beam generated between the first time t1 and the second time t2.

The first light L1 is emitted at the first angle a1° with the surface of the antenna 140 by the laser beam generated at the first wavelength λ1. In addition, the second light L2 is emitted at the second angle a2° with the surface of the antenna 140 by the laser beam generated at the second wavelength λ2. Therefore, the laser beam emitted from the antenna 140 can change from the first light L1 forming the first angle a1° with the antenna 140 to the second light L2 forming the second angle a2, by the laser beam in which the wavelength changes from the first wavelength λ1 to the second wavelength λ2.

Likewise, the graph of FIG. 4 illustrates that the angle formed between the light emitted from the antenna 140 and the antenna 140 linearly increases from the first angle a1° of the first time t1 to the second angle a2° of the second time t2, but the present disclosure is not limited thereto. The graph of FIG. 4 is an example, and the angle formed between the laser beam emitted between the first time t1 and the second time t2 with respect to the antenna 140 may also change nonlinearly.

In summary, the optical beam steering device 100 according to some example embodiments of the present disclosure may control the emission angle of the laser beam to be emitted from the antenna 140, using the change in the wavelength of the laser beam generated from the tunable laser diode 110.

That is, in the optical beam steering device 100, the tunable laser diode 110 generates the laser beam of the first wavelength λ1 and provides the first laser beam (e.g., Li1) to the antenna 140, and the antenna 140 receives the first laser beam of the first wavelength λ1 (e.g., Li1) and may, in response, emit first light L1 forming a first angle a1° with the surface of the antenna 140.

Subsequently, the optical beam steering device 100 generates second laser beam (e.g., Li2) of the second wavelength λ2 different from the first wavelength λ1, and the antenna 140 may receive the second laser beam (e.g., Li2) of the second wavelength λ2 and may, in response emit the second light L2 forming the second angle a2° with the surface of the antenna 140.

Restated, the tunable laser diode 110 may be configured to continuously change wavelength of the laser beams output thereby between the first wavelength λ1 and the second wavelength λ2, such that the tunable laser diode 110 is configured to continuously change between emitting the first laser beam Li1 and emitting the second laser beam Li2; and the antenna 140 may be configured to continuously change emission angles of the linear light source between the first emission angle a1° and the second emission angle a2°. As a result, the antenna 140 may be configured to "scan" a target within a range between the first emission angle a1° and the second emission angle a2° based on adjusting the linear light source output from the antenna 140, and thus output from the optical beam steering device 100, from having a emission angle a1° and having a second emission angle a2°.

The optical beam steering device 100 may irradiate a laser beam forming an angle in the range of a2°-a1° with the surface of the antenna 140 through the above-described control of the laser beam. The optical beam steering device 100 emits a linear light source, that is, laser beam of one-dimensional form through the antenna 140.

Incidentally, as described above, by changing the wavelength of the laser beam generated by the tunable laser diode 110, the angle formed between the laser beam emitted from the antenna 140 and the surface of the antenna 140 may change. Therefore, the region irradiated with the laser beam of one-dimensional form emitted through the antenna 140 is moved, and it is possible to obtain the same effect as the case where the linear light source sequentially passes through the two-dimensional region, thereby improving performance of the optical beam steering device 100 by enabling scanning of a target with a linear light source by adjusting the wavelength of the laser beam emitted by the tunable laser diode 110 to cause the linear light source to scan between different emission angles. The optical beam steering device 100 may further have improved compactness as a result of including at least the tunable laser diode 110 and antenna 140 as described herein.

When the angle of the laser beam emitted from the antenna 140 with the surface of the antenna 140 changes from a1° to a2°, the laser beam emitted from the antenna 140 may move in the same direction as the extension direction of the antenna 140. That is, in the case where the antenna 140 is a vertical antenna, the light emitted from the antenna 140 is a horizontal linear light source, and the laser beam emitted from the antenna 140 through the optical beam steering process may move in the vertical direction.

In some example embodiments, when the antenna 140 is a horizontal antenna, the laser beam emitted from the antenna 140 is a vertical linear light source, and the laser beam emitted from the antenna 140 by the optical beam steering process may move in the horizontal direction.

However, the present disclosure is not limited thereto, and when the antenna 140 is disposed in an arbitrary first direction (e.g., a surface of the antenna 140 from which a laser beam is output extends in an arbitrary first direction), and the laser beam emitted from the antenna 140 is linear light source extending in a second direction orthogonal or substantially orthogonal (e.g., orthogonal within manufacturing tolerances and/or material tolerances) to the first direction, the laser beam may move in an arbitrary first direction by the optical steering of the optical beam steering device 100. Accordingly, at least the tunable laser diode 110 and the antenna 140 may be collectively configured to output a linear light source and cause the linear light source to move between the first emission angle a1° and the second emission angle a2° along the arbitrary first direction. When the antenna 140 is a horizontal antenna, the first direction may be a horizontal direction and the second direction may be a vertical direction.

In summary, the optical beam steering device 100 according to some example embodiments of the present disclosure has a configuration for two-dimensionally irradiating the target with a laser beam, and includes a relatively simple system including the tunable laser diode 110, the optical amplifier 120, the bandpass filter 130 and then antenna 140. Such a system may thus have improved compactness and/or operational reliability. While laser beam having a wavelength changed by the tunable laser diode 110 is emitted by the antenna 140, and two-dimensional laser beam irradiation of the target can be performed, using the one-dimensional light.

Figure 5:
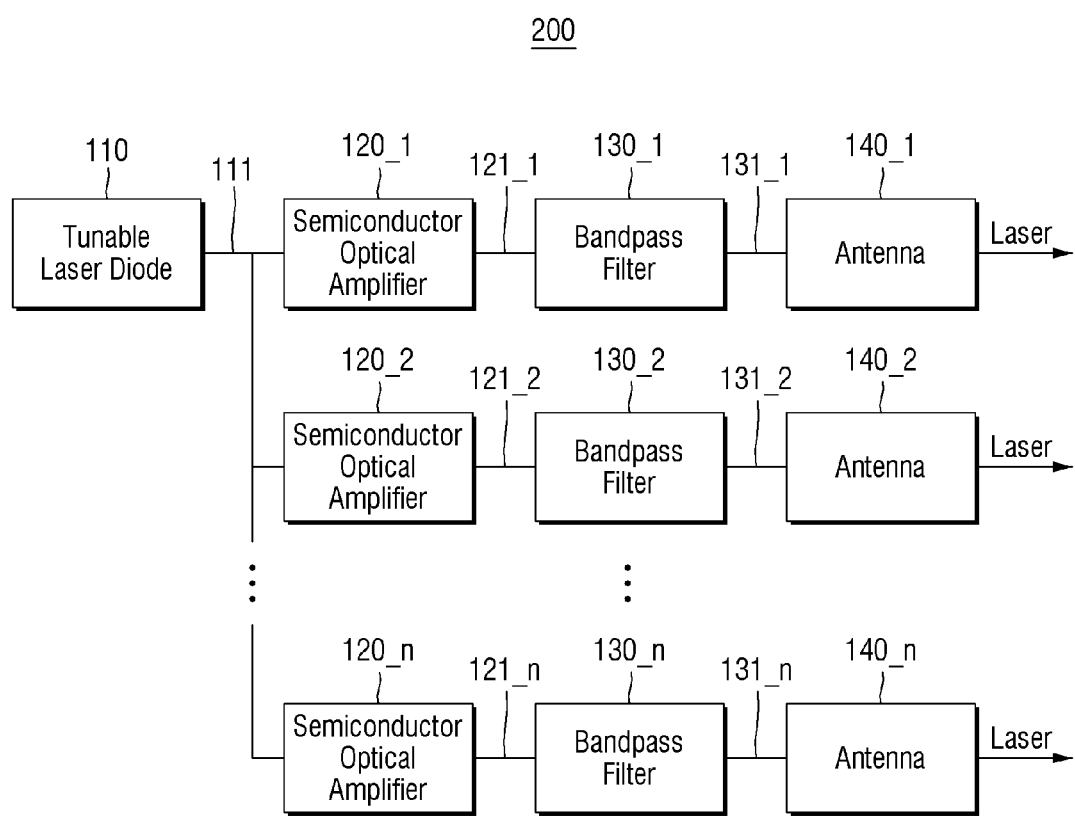
FIG. 5 is a block diagram of the optical beam steering device according to some example embodiments of the present disclosure.

FIG. 5 is a block diagram of the optical beam steering device according to some example embodiments of the present disclosure.

Referring to FIG. 5, an optical beam steering device 200 according to some example embodiments of the present disclosure includes a tunable laser diode 110, first to n-th optical amplifiers (120_1 to 120_n), first to n-th bandpass filters (130_1 to 130_n), and first to n-th antennas (140_1 to 140_n). Here, n means a natural number of 2 or more.

The tunable laser diode 110 is the same as the tunable laser diode 110 described with reference to FIG. 1. Therefore, the tunable laser diode 110 changes the wavelength of the laser beam through the change of the oscillation frequency, and may provide the generated laser beam to the first to n-th optical amplifiers (120_1 to 120_n) through the waveguide 111.

The first to n-th optical amplifiers (120_1 to 120_n) may amplify the laser beam provided from the tunable laser diode 110 through the waveguide 111. The first to n-th optical amplifiers (120_1 to 120_n) are provided with the current from an external power supply, and may generate the amplified laser beam, using the energy of the provided current. Although the first to n-th optical amplifiers (120_1 to 120_n) may amplify the laser beam provided from the tunable laser diode 110 with the same gain, the present disclosure is limited to thereto. The first to n-th optical amplifiers (120_1 to 120_n) may amplify the laser beam provided from the tunable laser diode 110 with different gains from each other.

The optical signals amplified from the first to n-th optical amplifiers (120_1 to 120_n) may be provided to the first to n-th bandpass filters (130_1 to 130_n) through the waveguides (121_1 to 121_n). The optical signals filtered by the first to n-th bandpass filters (130_1 to 130_n) may be provided to the first to n-th antennas (140_1 to 140_n) through the waveguides (131_1 to 131_n).

The first to n-th bandpass filters (130_1 to 130_n) are provided with the laser beam provided from the optical amplifiers (120_1 to 120_n) through the waveguides (121_1 to 121_n), and may filter optical signals of the laser beam other than the band to be used by the optical beam steering device 100. Noise can be removed from the optical signal that has passed through the bandpass filters (130_1 to 130_n). The filtered optical signal may be provided to the antennas (140_1 to 140_n) through the waveguides (130_1 to 130_n).

Restating what is shown in FIG. 5, the optical beam steering device 200 may include, in addition to a tunable laser diode 110 configured to emit first and second laser beams having different, first and second wavelengths, respectively, first and second optical amplifiers (e.g., 120_1 and 120_2) configured to amplify the first and second laser beams emitted by the tunable laser diode 110, respectively, first and second bandpass filters (e.g., 130_1 and 130_2) configured to filter the first and second laser beams amplified by the optical amplifier, respectively (e.g., via 121_1 and 121_2, respectively), and first and second antennas (e.g., 140_1 and 140_2) configured to convert the filtered first and second laser beams to separate linear light sources, respectively.

In some example embodiments, the optical amplifiers 120_1 to 120_n and the bandpass filters 130_1 to 130_n may be omitted from the optical beam steering device 200, such that the optical beam steering device 200 according to some example embodiments of the present disclosure includes a tunable laser diode 110 and first to n-th antennas (140_1 to 140_n).

In some example embodiments, the optical beam steering device 200 includes a single optical amplifier 120 configured to amplify laser beams emitted by the tunable laser diode 110, such that multiple bandpass filters (e.g., 130_1 and 130_2) are configured to filter the laser beams amplified by the optical amplifier 120 and provide the filtered laser beams to separate, respective antennas (e.g., 140_1 and 140_2, respectively).

In some example embodiments, the optical beam steering device 200 includes a single optical amplifier 120 and a single bandpass filter 130 where the bandpass filter is configured to filter the laser beams amplified by the optical amplifier 120 and provide the filtered laser beams to separate, respective antennas (e.g., 140_1 and 140_2, respectively).

Each of the configurations of the first to n-th antennas (140_1 to 140_n) may be different from that of the antenna 140 included in some example embodiments, including the example embodiments described above. This will be described in more detail with reference to FIGS. 6A to 6C.

Figure 6A:
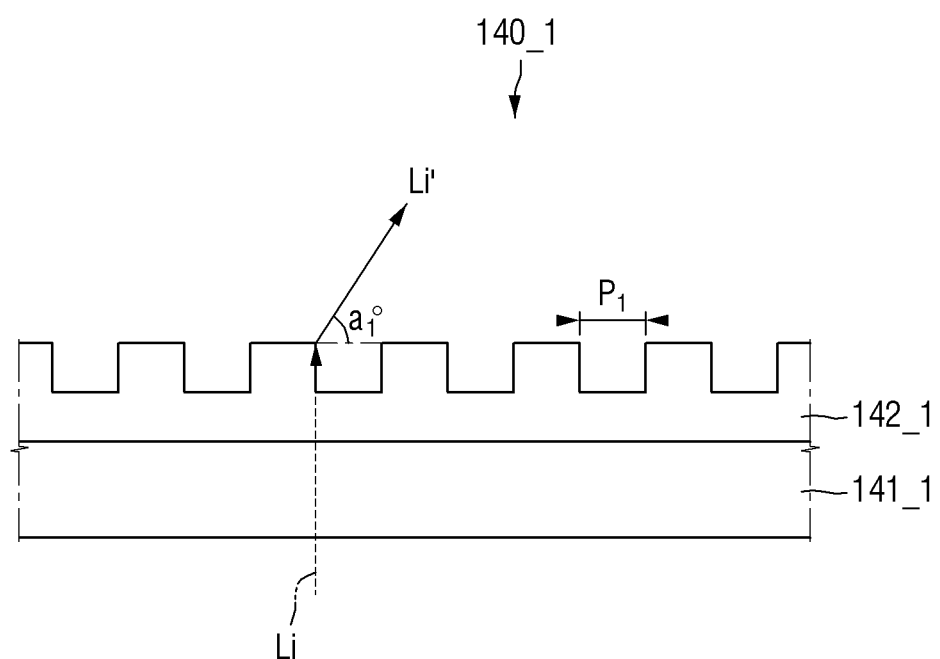
FIGS. 6A, 6B, and 6C are cross-sectional views for explaining the antenna included in the optical beam steering device of FIG. 5.
Figure 6B:
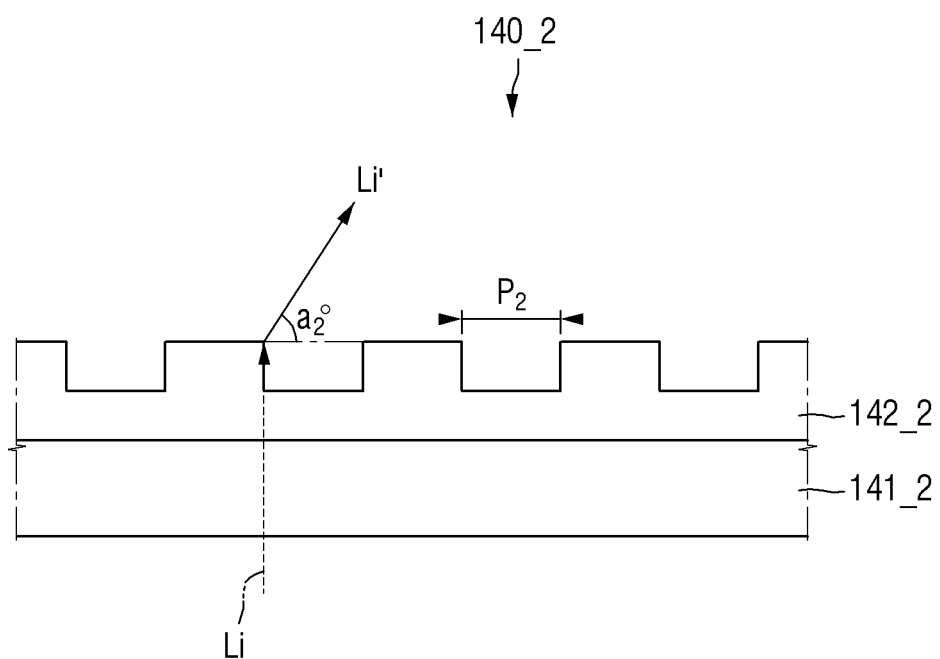
Figure 6C:
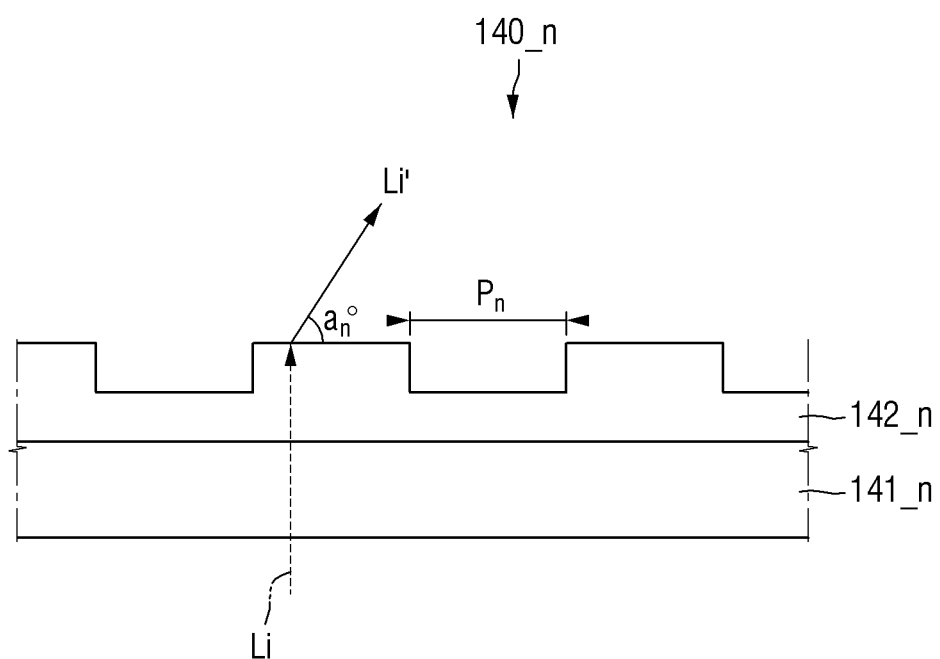

FIGS. 6A, 6B, and 6C are cross-sectional views for explaining the antenna included in the optical beam steering device of FIG. 5.

First, referring to FIG. 6A, the first antenna 140_1 may include a substrate 141_1, and a plurality of gratings 142_1 formed on the substrate 141_1. Since the substrate 141_1 and the grating 142_1 are the same as the substrate 141 and the grating 142 described with reference to FIG. 2, the description thereof will not be provided.

The plurality of gratings 142_1 may be separated from each other by a first distance P1. An emission angle a1° of the laser beam Li' output based on receipt of laser beam Li at the plurality of gratings 142_1 may be determined by (e.g., based on) the distance P1 between the gratings 142_1 and the wavelength of the beam generated from the tunable laser diode 110.

Subsequently, referring to FIG. 6B, the second antenna 140_2 may include a substrate 141_2, and a plurality of gratings 142_2 formed on the substrate 141_2. The plurality of gratings 142_2 may be separated from each other by a second distance P2. The second distance P2 between the plurality of gratings 142_2 may be different from the first distance P1 between the gratings 142_1.

The emission angle a2° of the laser beam Li' output based on receipt of laser beam Li at the plurality of gratings 142_2 may be determined by (e.g., based on) the distance P2 between the gratings 142_2 and the wavelength of the beam generated from the tunable laser diode 110. Since the second distance P2 and the first distance P1 are different from each other, the angle a2° formed between the laser beam emitted from the second antenna 140_2 and the surface of the second antenna 140_2 may be different from the angle a1° formed between the laser beam emitted from the first antenna 140_1 and the surface of the first antenna 140_1.

Referring also to FIG. 6C, the n-th antenna 140_n may include a substrate 141_n, and a plurality of gratings 142_n formed on the substrate 141_n. The plurality of gratings 142_n may be separated from each other by a n-th distance Pn. The n-th distance Pn between the plurality of gratings 142_1 may be different from the first distance P1 between the gratings 142_1.

The emission angle an° of the laser beam Li' output based on receipt of laser beam Li at the plurality of gratings 142_n may be determined by (e.g., based on) the distance Pn between the gratings 142_n and the wavelength of the beam generated from the tunable laser diode 110. Since the n-th distance Pn and the first distance P1 are different from each other, an angle an° formed between the laser beam emitted from the n-th antenna 140_n and the surface of the n-th antenna 140_1 may be different from the angle a1° formed between the laser beam emitted from the first antenna 140_1 and the surface of the first antenna 140_1.

In some example embodiments of the present disclosure, the first to n-th antennas (140_1 to 140_n) may be antennas disposed in the same direction. That is, when the first antenna 140_1 is disposed in the vertical direction, the second to n-th antennas (140_2 to 140_n) may also be disposed in the vertical direction. In this case, all the laser beams emitted from the first to n-th antennas (140_1 to 140_n) may have the form of horizontal linear light sources.

However, the present disclosure is not limited thereto, and the first to n-th antennas (140_1 to 140_n) may be disposed in an arbitrary first direction, and laser beams emitted from the first to n-th antennas (140_1 to 140_n) may be in the form of a linear light source extending in a second direction orthogonal or substantially orthogonal to the first direction. When an antenna 140 is a horizontal antenna, the first direction may be a horizontal direction and the second direction may be a vertical direction. For example, a first antenna 140_1 may extend in a first direction and may be configured to convert filtered first laser beams to a linear light source extending in a second direction that is substantially orthogonal to the first direction, and a second antenna 140_2 may extend in the second direction and may be configured to convert filtered second laser beams to a linear light source extending in the first direction. The first antenna 140_1 may receive a filtered first laser beam and, in response, output a linear light source having a first emission angle with a surface of the first antenna 140_1, and the second antenna 140_2 may receive a filtered second laser beam and, in response, output a linear light source having a second emission angle with a surface of the second antenna 140_2, the second emission angle different from the first emission angle.

In some example embodiments, different antennas (e.g., 140_1 and 140_2) may each be configured to separately receive a laser beam having a common wavelength emitted by the tunable laser diode 110 and may each, separately, convert the laser beam to separate linear light sources having separate emission angles with the surfaces of the respective different antennas. For example, and with reference to FIGS. 6A-6C, where the tunable laser diode 110 emits a laser beam having a given wavelength, a first antenna (e.g., 140_1), which includes a first antenna which includes a plurality of first gratings spaced apart from each other by a first distance, may be configured to convert the laser beam to a linear light source having a first emission angle with a surface of the first antenna through the plurality of first gratings, and a second antenna (e.g., 140_2), the second antenna configured to convert the laser beam to a linear light source having a second emission angle with the surface of the second antenna through the plurality of second gratings.

Figure 7A:
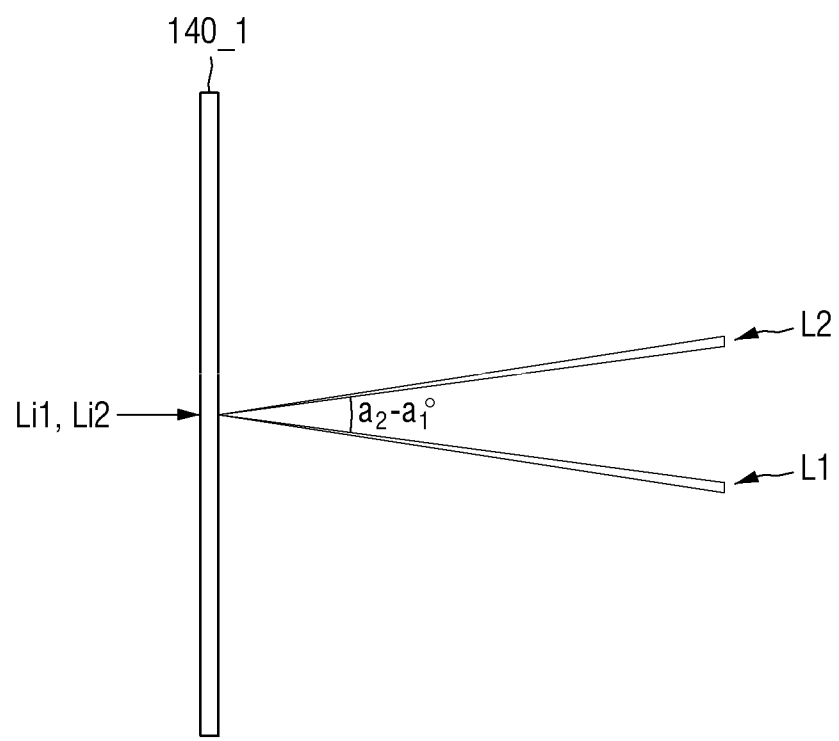
FIGS. 7A and 7B are conceptual diagrams for explaining the operation of the optical beam steering device of FIG. 5.
Figure 7B:
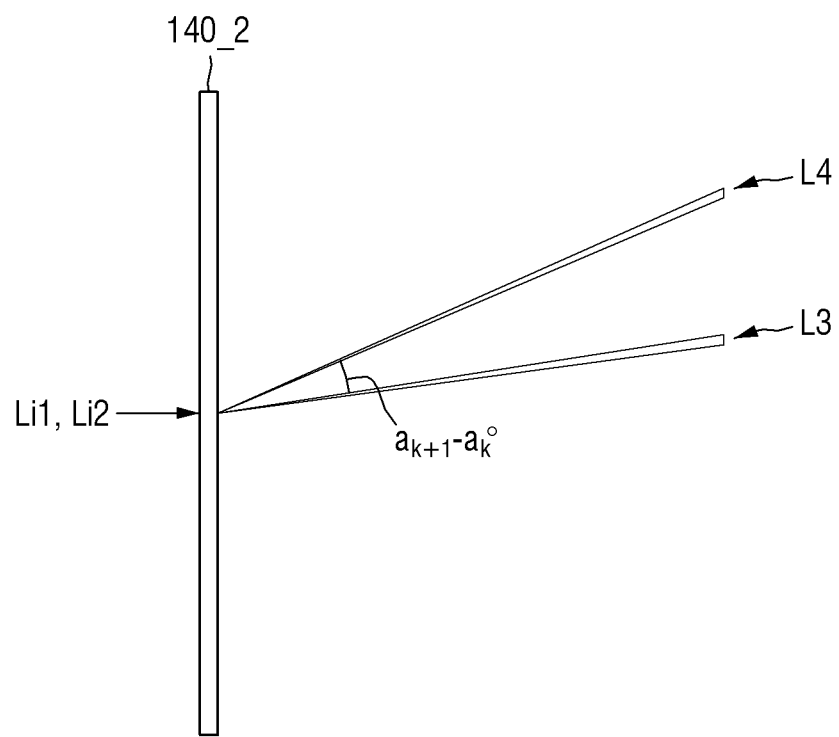

FIGS. 7A and 7B are conceptual diagrams for explaining the operation of the optical beam steering device of FIG. 5.

Referring first to FIG. 7A, the first antenna 140_1 is illustrated to emit a laser beam forming an angle between a1° and a2° with its surface. That is, similarly to the operation of the optical beam steering device 100 described with reference to FIGS. 3 and 4, when the tunable laser diode 110 generates the laser beam between the first wavelength λ1 and the second wavelength λ2, the first antenna 140_1 may emit laser beam having an angle of the range of a2°-a1° with the surface of the first antenna 140_1.

Therefore, the optical beam steering device 200 moves a region irradiated with the one-dimensional form of the laser beam emitted through the first antenna 140_1, and may have the same effect as a case where the linear light source sequentially passes through the two-dimensional region.

Referring to FIG. 7B, the second antenna 140_2 is illustrated to emit laser beam forming an angle ak+1° to ak° with its surface. When the tunable laser diode 110 generates laser beam between the first wavelength λ1 and the second wavelength λ2, the second antenna 140_2 may emit laser beam forming the angles of the range of ak+1°-ak° with the surface of the second antenna 140_2.

Therefore, the optical beam steering device 200 moves a region irradiated with the one-dimensional form of the laser beam emitted through the second antenna 140_1, and may have the same effect as a case where the linear light source sequentially passes through the two-dimensional region.

Restating what is shown in FIGS. 7A and 7B, a tunable laser diode 110 may be configured to emit a first laser beam having a first wavelength and a second laser beam having a second wavelength different from the first wavelength, and a given antenna (e.g., a first antenna 140_1) may be configured to receive the first laser beam (e.g., Li1) and, in response, output a linear light source having a first emission angle (e.g., L1) and may be further configured to receive the second laser beam (e.g., Li2) and, in response, output a linear light source having a third emission angle (e.g., L2), the third emission angle different from the first emission angle, and another antenna (e.g., a second antenna 140_2) may be configured to receive the first laser beam (e.g., Li1) and, in response, output a linear light source having a second emission angle (e.g., L3), and may be further configured to receive the second laser beam (e.g., Li2) and, in response, output a linear light source having a fourth emission angle (e.g., L4), the fourth emission angle different from the second emission angle.

The tunable laser diode 110 may be configured to continuously change a wavelength of the laser beams emitted by the tunable laser diode between the first wavelength and the second wavelength, such that the tunable laser diode is configured to continuously change between emitting the first laser beam (e.g., Li1) and emitting the second laser beam (e.g., Li2), and the first antenna (e.g., 140_1) may be configured to continuously change emission angles of the linear light source output by the first antenna between the first emission angle (e.g., L1) and the third emission angle (e.g., L2). In addition, the second antenna (e.g., 140_2) may be configured to continuously change emission angles of the linear light source output by the second antenna between the second emission angle (e.g., L3) and the fourth emission angle (e.g., L4).

Figure 8:
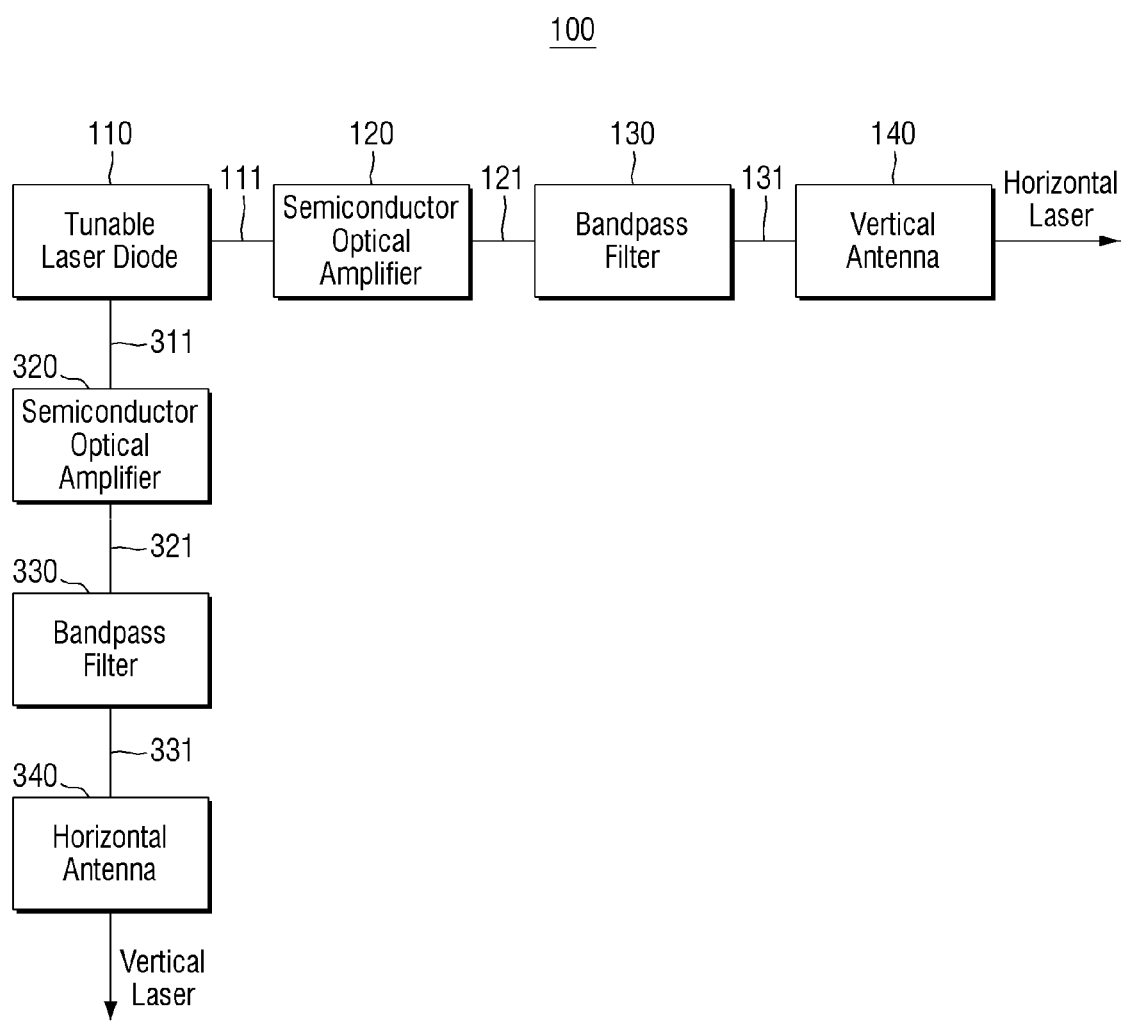
FIG. 8 is a block diagram of the optical beam steering device according to some example embodiments of the present disclosure.

FIG. 8 is a block diagram of the optical beam steering device according to some example embodiments of the present disclosure.

Referring to FIG. 8, an optical beam steering device 300 according to some example embodiments of the present disclosure may include a tunable laser diode 110, optical amplifiers (120, 320), bandpass filters (130, 330) and antennas (140, 340).

Since the tunable laser diode 110, the optical amplifier 120, and the bandpass filter 130 are the same as the constituent elements of the optical beam steering device 100 previously described with reference to FIG. 1, detailed description thereof will not be provided.

The optical beam steering device 300 may include a vertical antenna 140. The vertical antenna 140 is a vertically disposed antenna and may emit laser having the form of horizontal linear light source.

Further, the tunable laser diode 110 may be connected to the optical amplifier 320 via the waveguide 311. Since the optical amplifier 320 and the bandpass filter 330 connected to the optical amplifier 320 through the waveguide 321 are also the same as the constituent elements of the optical beam steering device 100 described using FIG. 1, the detailed description thereof will not be provided. Additionally, since the bandpass filter 330 and the antenna 340 connected to the bandpass filter 330 through the waveguide 331 are also the same as the constituent elements of the optical beam steering device 100 described using FIG. 1, the detailed description thereof will not be provided.

The optical beam steering device 300 may include a horizontal antenna 340. The horizontal antenna 340 is disposed in a horizontal direction, and may emit laser having the form of vertical linear light source.

That is, the optical beam steering device 300 according to some example embodiments of the present disclosure illustrated in FIG. 8 may simultaneously include the vertical antenna 140 and the horizontal antenna 340. The optical beam steering device 300 may selectively emit laser beam to the target through one of the vertical antenna 140 and the horizontal antenna 340 as needed. Restated, the optical beam steering device 300 may be configured to control at least one of the vertical antenna 140 (e.g., a first antenna) and the horizontal antenna (e.g., a second antenna) such that the optical beam steering device 300 is configured to selectively output a linear light source extending in the second direction or a linear light source extending in the first direction.

Figure 9:
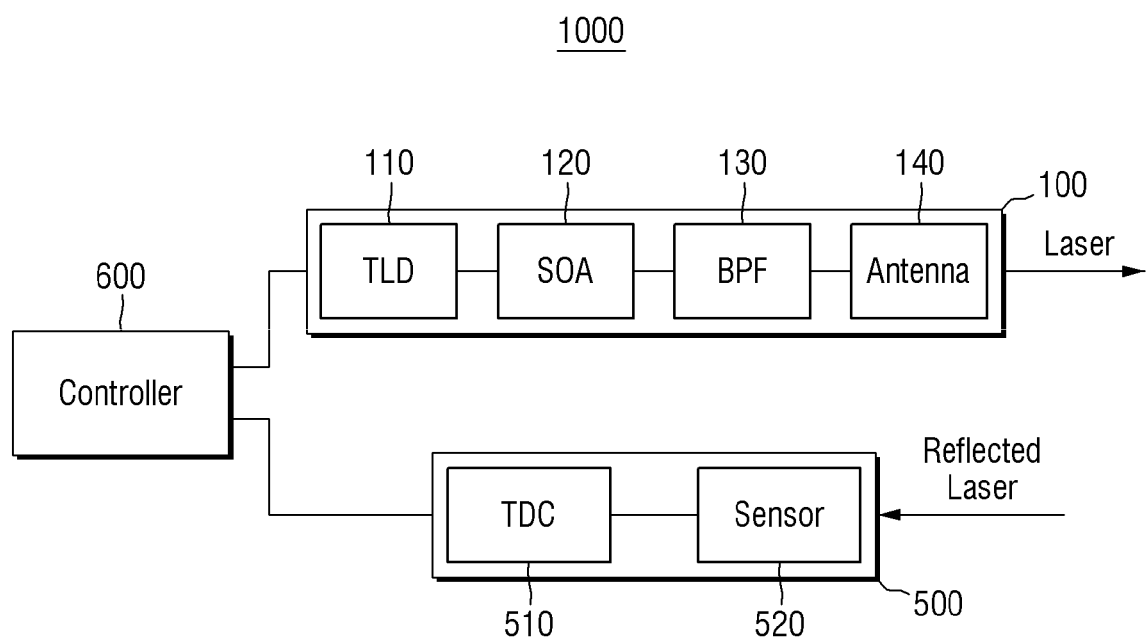
FIG. 9 is a block diagram of a sensor system including the optical beam steering device according to some example embodiments of the present disclosure.

FIG. 9 is a block diagram of a sensor system including the optical beam steering device according to some example embodiments of the present disclosure.

Referring to FIG. 9, a sensor system 1000 according to some example embodiments of the present disclosure may include an optical beam steering device 100, a receiver 500 (also referred to herein as an optical receiver), and a controller 600.

Since the optical beam steering device 100 is the same as the optical beam steering device described above with reference to some example embodiments, the description thereof will not be provided. The sensor system 1000 may irradiate a target with a laser beam, using the optical beam steering device 100. Restated, the optical beam steering device 100 may be configured to irradiate a target with an output light.

The receiver 500 may detect (e.g., receive) the laser beam (e.g., output light) reflected from the target and may generate an electric signal on the basis of the detected laser beam. Specifically, the receiver 500 may include a time-to-digital converter (TDC) 510 and a sensor 520.

The receiver 500 may detect the laser beam (e.g., output light) reflected from the target through the sensor 520. The sensor 520 may include, for example, a photodiode array, and may specifically include a plurality of photodiode arrays arranged one-dimensionally or two-dimensionally. The sensor 520 may receive the laser beam, convert the laser beam into an electric signal, and provide the electric signal to the TDC 510. Restated, the sensor 520 may be configured to detect output light reflected from a target and to generate an electrical signal based on the detecting.

The TDC 510 may numerically analyze the electrical signal provided by the sensor 520. For example, each of the photodiode arrays included in the sensor 520 has a time difference and numerically analyzes the received laser beam signal, thereby converting distance information between the sensor system 1000 and the target into a numerical value. Restated, the TDC 510 may be configured to convert time difference information included in the electrical signal generated by the sensor 520 into numerical information.

The controller 600 may control the optical beam steering device 100 and the receiver 500. In particular, the controller 600 may interpret the distance between the target and the sensor system 1000, the shape of the object, and the like, using the numerical information provided by the receiver 500.

In some example embodiments, the sensor system 1000 may be included in one or more portions of a vehicle, including an automobile. A vehicle may include a vehicle that is configured to be driven ("navigated") manually (e.g., based on manual interaction with one or more driving instruments of the vehicle by at least one occupant of the vehicle), a vehicle that is configured to be driven ("navigated") autonomously (e.g., an autonomous vehicle configured to be driven based on at least partial computer system control of the vehicle with or without input from vehicle occupant(s)), some combination thereof, or the like. For example, in some example embodiments, the vehicle may be configured to be driven ("navigated") through an environment based on generation of data by one or more sensor systems 1000 included in the vehicle. Such navigation may include the vehicle being configured to navigate through an environment, in relation to an object located in the environment, based on data generated by the sensor system 1000 (e.g., the receiver 500) as a result of the sensor system 1000 (e.g., optical beam steering device 100) emitting a light beam (e.g., a laser beam) into the environment and detecting the object in the environment, where the sensor system 1000 may detect the object based on detecting a reflection and/or scattering of the emitted light beam off of the object.

In some example embodiments, based on the sensor system 1000 providing improved reliability, improved accuracy, improved compactness, and reduced cost, the sensor system 1000 may enable a vehicle to be configured to implement autonomous navigation of an environment, via incorporation of a sensor system 1000 that includes at least the optical beam steering device 100, with improved reliability, reduced cost, and reduced space requirements within the vehicle to incorporate the sensor system 1000 that may enable environment monitoring to further enable autonomous navigation through the environment.

In some example embodiments, the sensor system 1000 omits moving mechanical elements, at least partially based on including the tunable laser diode 110 and the antenna 140 as described herein. Accordingly, the sensor system 1000 may have improved compactness, reliability, and performance in relation to sensor systems including mechanical elements.

Figure 10:
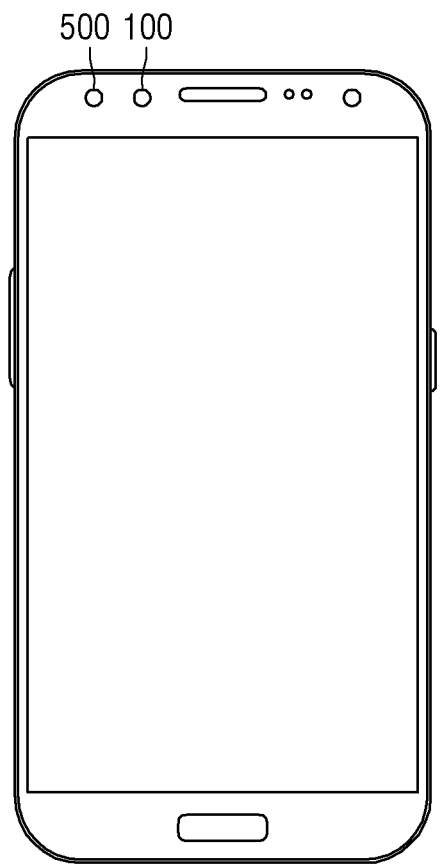
FIG. 10 is an example semiconductor system to which the optical beam steering device and the sensor system according to some example embodiments of the present disclosure can be applied.

FIG. 10 is an example semiconductor system to which the optical beam steering device and the sensor system according to some example embodiments of the present disclosure can be applied.

Referring to FIG. 10, a smartphone 1500 which is an example semiconductor system including an optical beam steering device according to some example embodiments of the present disclosure is illustrated. The smartphone 1500 may include the optical beam steering device 100 and the receiver 500. The smartphone 1500 irradiates a user with laser beam using the optical beam steering device 100, and the receiver 500 receives the laser beam reflected from the user, thereby scanning the user.

Example embodiments of the present disclosure have been described with reference to the attached drawings, but it may be understood by one of ordinary skill in the art that the present disclosure may be performed one of ordinary skill in the art in other specific forms without changing the technical concept or essential features of the present disclosure. Further, the above-described embodiments are merely examples and do not limit the scope of the rights of the present disclosure.

What is claimed is:

1. An optical beam steering device, comprising:
a tunable laser diode configured to emit laser beams, the emitting including
emitting a first laser beam having a first wavelength, and
emitting a second laser beam having a second wavelength, the second wavelength different from the first wavelength; and
an antenna including a grating structure, the antenna configured to convert the laser beams emitted by the tunable laser diode to a linear light source based on the grating structure, the converting including
receiving the first laser beam and, in response, outputting a first linear light source having a first emission angle with a surface of the antenna, and
receiving the second laser beam and, in response, outputting a second linear light source having a second emission angle with the surface of the antenna, the second emission angle different from the first emission angle.

2. The optical beam steering device of claim 1, wherein the tunable laser diode is configured to continuously change a wavelength of the laser beams emitted by the tunable laser diode between the first wavelength and the second wavelength, such that the tunable laser diode is configured to continuously change between emitting the first laser beam and emitting the second laser beam, and
the antenna is configured to continuously change emission angles of the linear light source between the first emission angle and the second emission angle.

3. The optical beam steering device of claim 2, wherein the antenna is configured to scan a target within a range between the first emission angle and the second emission angle.

4. The optical beam steering device of claim 1, wherein the surface of the antenna extends in a first direction, and the linear light source extends in a second direction substantially orthogonal to the first direction.

5. The optical beam steering device of claim 4, wherein the tunable laser diode and the antenna are collectively configured to cause the linear light source to move between the first emission angle and the second emission angle along the first direction.

6. The optical beam steering device of claim 4, wherein the first direction is a horizontal direction and the second direction is a vertical direction.

7. The optical beam steering device of claim 1, further comprising:
an optical amplifier configured to amplify the laser beams emitted by the tunable laser diode.

8. The optical beam steering device of claim 7, further comprising:
a bandpass filter configured to filter the laser beams amplified by the optical amplifier, the bandpass filter further configured to provide the filtered laser beams to the antenna.

9. An optical beam steering device, comprising:
a tunable laser diode configured to emit laser beams, the emitting including
emitting a first laser beam having a first wavelength, and
emitting a second laser beam having a second wavelength, the second wavelength different from the first wavelength;
first and second optical amplifiers configured to amplify the first and second laser beams emitted by the tunable laser diode, respectively;
first and second bandpass filters configured to filter the first and second laser beams amplified by the first and second optical amplifiers, respectively;
a first antenna extending in a first direction, the first antenna configured to convert the filtered first laser beam to a first linear light source extending in a second direction that is substantially orthogonal to the first direction, such that the first linear light source extending in the second direction has a first emission angle with a surface of the first antenna; and
a second antenna extending in the second direction, the second antenna configured to convert the filtered second laser beam to a second linear light source extending in the first direction, such that the second linear light source extending in the first direction has a second emission angle with a surface of the second antenna, the second emission angle different from the first emission angle.

10. The optical beam steering device of claim 9, wherein the tunable laser diode is configured to continuously change a wavelength of the laser beams emitted by the tunable laser diode between the first wavelength and the second wavelength, such that the tunable laser diode is configured to continuously change between emitting the first laser beam and emitting the second laser beam, and
the first antenna is configured to continuously change emission angles of the first linear light source extending in the second direction between the first emission angle and a third emission angle.

11. The optical beam steering device of claim 10, wherein the first antenna is configured to scan a target within a range between the first emission angle and the third emission angle.

12. The optical beam steering device of claim 9, wherein the optical beam steering device is configured to control at least one of the first antenna and the second antenna to selectively output the first linear light source extending in the second direction or the second linear light source extending in the first direction.

13. An optical beam steering device, comprising:
a tunable laser diode configured to emit a laser beam;
a first antenna including a plurality of first gratings spaced apart from each other by a first distance, the first antenna configured to convert the laser beam to a first linear light source having a first emission angle with a surface of the first antenna through the plurality of first gratings; and
a second antenna including a plurality of second gratings spaced apart from each other by a second distance different from the first distance, the second antenna configured to convert the laser beam to a second linear light source having a second emission angle with a surface of the second antenna through the plurality of second gratings.

14. The optical beam steering device of claim 13, wherein the tunable laser diode is configured to emit a first laser beam having a first wavelength and a second laser beam having a second wavelength different from the first wavelength,
the first antenna is configured to receive the first laser beam and, in response, output the linear light source having the first emission angle, and the first antenna is further configured to receive the second laser beam and, in response, output a third linear light source having a third emission angle with the surface of the first antenna, the third emission angle different from the first emission angle.

15. The optical beam steering device of claim 14, wherein
the second antenna is configured to receive the first laser beam and, in response, output the linear light source having the second emission angle, and
the second antenna is further configured to receive the second laser beam and, in response, outputs a fourth linear light source having a fourth emission angle with the surface of the second antenna, the fourth emission angle different from the second emission angle.

16. The optical beam steering device of claim 14, wherein
the tunable laser diode is configured to continuously change a wavelength of the laser beam emitted by the tunable laser diode between the first wavelength and the second wavelength, such that the tunable laser diode is configured to continuously change between emitting the first laser beam and emitting the second laser beam, and
the first antenna is configured to continuously change emission angles of the linear light source output by the first antenna between the first emission angle and the third emission angle.

17. The optical beam steering device of claim 16, wherein the second antenna is configured to continuously change emission angles of the linear light source output by the second antenna between the second emission angle and a fourth emission angle, the fourth emission angle different from the second emission angle.

18. The optical beam steering device of claim 13, further comprising:
an optical amplifier configured to amplifies the laser beam emitted by the tunable laser diode.

19. The optical beam steering device of claim 18, further comprising:
a first bandpass filter configured to filter the laser beam amplified by the optical amplifier and provide the laser beam filtered by the first bandpass filter to the first antenna; and
a second bandpass filter configured to filter the laser beam amplified by the optical amplifier and provide the laser beam filtered by the second bandpass filter to the second antenna.

20. The optical beam steering device of claim 13, wherein
the first antenna extends in a first direction, and
the first linear light source which is output from the first antenna extends in a second direction substantially orthogonal to the first direction.

* * * * *